(12) United States Patent
Sehrawat et al.

(10) Patent No.: US 11,871,236 B2
(45) Date of Patent: Jan. 9, 2024

(54) METHOD AND A SYSTEM FOR DYNAMIC DISCOVERY OF MULTI-ACCESS EDGE COMPUTING (MEC) APPLICATIONS

(71) Applicant: Hughes Systique Corporation, Gurgaon (IN)

(72) Inventors: Deepak Sehrawat, Gurgaon (IN); Ajay Khanna, Gurgaon (IN)

(73) Assignee: Hughes Systique Corporation, Gurgaon (IN)

( * ) Notice: Subject to any disclaimer, the term of this patent is extended or adjusted under 35 U.S.C. 154(b) by 62 days.

(21) Appl. No.: 17/579,393

(22) Filed: Jan. 19, 2022

(65) Prior Publication Data

US 2022/0232386 A1    Jul. 21, 2022

(30) Foreign Application Priority Data

Jan. 20, 2021  (IN) .............................. 202111002754

(51) Int. Cl.

| | |
|---|---|
| H04M 1/66 | (2006.01) |
| H04B 7/00 | (2006.01) |
| G08C 15/00 | (2006.01) |
| H04W 12/30 | (2021.01) |
| H04W 12/08 | (2021.01) |
| H04W 4/50 | (2018.01) |
| H04W 84/12 | (2009.01) |
| H04L 61/4511 | (2022.01) |

(52) U.S. Cl.
CPC ............ *H04W 12/35* (2021.01); *H04W 4/50* (2018.02); *H04W 12/08* (2013.01); *H04L 61/4511* (2022.05); *H04W 84/12* (2013.01)

(58) Field of Classification Search
CPC ....... H04W 12/35; H04W 4/50; H04W 12/08; H04W 84/12; H04L 61/4511
USPC .......................................................... 455/411
See application file for complete search history.

(56) References Cited

U.S. PATENT DOCUMENTS

| | | | |
|---|---|---|---|
| 2012/0178488 A1* | 7/2012 | Jonker .................. | H04W 8/005 |
| | | | 455/517 |
| 2018/0041897 A1* | 2/2018 | Prasad .................... | H04W 4/50 |
| 2018/0351824 A1* | 12/2018 | Giust ..................... | H04L 41/20 |
| 2019/0319868 A1* | 10/2019 | Svennebring ......... | H04W 24/08 |
| 2020/0084202 A1* | 3/2020 | Smith .................. | H04L 41/5003 |

(Continued)

*Primary Examiner* — Mark G. Pannell
(74) *Attorney, Agent, or Firm* — Finnegan, Henderson, Farabow, Garrett & Dunner LLP

(57) ABSTRACT

A system dynamic discovery of MEC applications is disclosed here. A user device dynamically selects a communication network by comparing existing network selection parameters present in the user device as part of a profile with network selection parameters that are received from a communication network infrastructure when the user device with a profile enters the MEC enabled premises. The authentication server authenticates a secure connection with the user device, and uses one or more authentication protocols associated with the profile. The CMP generates an authorization token based on the profile, and accesses the MEC applications using the authorization token on behalf of the user device via a first interface. The second interface verifies the received authorization token. The CMP grants access to the user device to access the communication network and manages the MEC applications of the service provider on behalf of the user device.

18 Claims, 3 Drawing Sheets

(56) References Cited

U.S. PATENT DOCUMENTS

| | | | |
|---|---|---|---|
| 2020/0235952 A1* | 7/2020 | Mukherjee | H04L 41/5019 |
| 2020/0302431 A1* | 9/2020 | Polehn | H04L 67/1004 |
| 2020/0389531 A1* | 12/2020 | Lee | H04L 67/01 |
| 2021/0105191 A1* | 4/2021 | Yang | G06F 11/3409 |
| 2021/0160304 A1* | 5/2021 | White | H04L 67/1004 |
| 2021/0235372 A1* | 7/2021 | Wang | H04W 28/0268 |
| 2021/0274328 A1* | 9/2021 | Feng | H04L 51/046 |
| 2022/0070267 A1* | 3/2022 | McCall | H04L 67/51 |
| 2022/0201597 A1* | 6/2022 | Kim | H04L 9/3213 |
| 2022/0255916 A1* | 8/2022 | Smith | G06F 21/44 |

* cited by examiner

METHOD AND A SYSTEM FOR DYNAMIC DISCOVERY OF MULTI-ACCESS EDGE COMPUTING (MEC) APPLICATIONS

TECHNICAL FIELD

The present invention relates to a method and a system for dynamic discovery of multi-access edge computing (MEC) applications. More specifically, related to discovery of the MEC applications without requiring the download of a service provider application in the mobile device.

BACKGROUND

Multi-Access Edge Computing (MEC) offers cloud-computing capabilities along with the required IT service environment inside or close to the network edge. This new paradigm has the potential to not only enable operators and service providers to meet the stringent requirements of 5G/Wi-Fi 6 like low latency, high bandwidth and high device density, but also enable developers and content providers to develop and deploy innovative use-cases such as compute intensive real-time gaming, live video streaming, augment reality, cognitive assistance etc.

From the operators' perspective, MEC is required to host multiple applications from multiple service providers over varied underlying infrastructure while still maintaining interoperability. In order to meet such complex requirements, European Telecommunication Standards Institute (ETSI) formulated an MEC ISG (Industry Specification Group) which led to creation of an open reference architecture [ref:1] along with service APIs [ref:2] for MEC. However, the specification does not define a way for end-user devices to discover the MEC applications without requiring them to download a service provider application in the mobile device.

Consider the network diagram shown in FIG. 1. It shows an MEC system deployed within a premise and using Wi-Fi as an access network. There are various upcoming implementations of MEC, but this is an embodiment of ETSI MEC reference architecture for all the terminologies, functional components and reference interfaces. The diagram shows only the relevant components and interfaces for MEC and the concerned network infrastructure. MEC system mainly consists of MEC host(s), an edge orchestrator, an OSS (Operations Support System) and multiple MEC applications. MEC host contains MEC platform which manages the MEC applications/services and a virtualization infrastructure which provides various resources such as compute, storage, network etc. for running the edge-applications. Edge orchestrator is a system level component which keeps an overall view of the MEC system, its resources, available services and manages the lifecycle of the applications running on the MEC hosts. OSS is an MEC operators' component which interacts with third party service providers and end users via CFP (customer facing portal) and UALCM (User Application Life Cycle Management) proxy modules over 'mx-1' and 'mx-2' interfaces, respectively.

The problem that is dealt in the current scenario is to allow users connected to Wi-Fi access network, to discover enterprise applications running on the MEC platform within the local mobile network. ETSI MEC defines two ways [ref:4] by which a client application can connect to a MEC application instance; but does not talk about discovery of MEC user application. However, it defines a management plane service API over Mx-2 interface [ref:5] to enable authorized user devices to communicate with MEC system for controlling the lifecycle of MEC user applications. This interface can be used by clients to get the list of MEC user applications. But this interface has two challenges. First the user device requires an application to access this interface. Secondly, the end user must provide some sort of authorization credentials to gain access to this interface.

The service providers usually offer their customers a downloadable application (app) to gain access to such information. But there are multiple reasons why this may not work seamlessly. First, there is lot of friction among the users in downloading an App on their device. Also, this approach does not work if the user has not downloaded the mobile APP. The user may not even be aware of mobile APP offered by the service provider. Also, the user must manually click and open the mobile APP to get access to MEC list of applications. Hence, the overall user experience is not seamless w.r.t gaining access to MEC user applications or services.

Therefore, there is a need for a method and system for discovering MEC applications over Wi-Fi access network using Hotspot 2.0 technology [ref:3] (also referred to as HS2.0) without an explicit client application that the user needs to download.

SUMMARY OF THE INVENTION

The following presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose to present some concepts of the subject matter in a simplified form as a prelude to the more detailed description that is presented later.

The method and system associated with the method that describes dynamic discovery of Multi-Access Edge Computing (MEC) applications on an MEC system, addresses the above-mentioned need for a method and system for discovering MEC applications over Wi-Fi access network using Hotspot 2.0 technology, without an explicit client application that the user needs to download.

The system comprises a user device, an authentication server, a communication management platform, a first interface, and a second interface. The user device dynamically selects, after discovering, a communication network by comparing existing network selection parameters present in the user device as part of a profile with network selection parameters that are received from a communication network infrastructure when the user device with a profile enters the MEC enabled premises. The authentication server of a service provider authenticates a secure connection with the user device, wherein the authentication server uses one or more authentication protocols associated with the profile. The communication management platform then generates an authorization token based on the profile, and accesses the MEC applications on the MEC system using the authorization token on behalf of the user device via a first interface. The second interface verifies, via the MEC system, the received authorization token by communicating between the service providers and the authentication server of the communication management platform. The communication management platform grants access to the user device to access the communication network and manages the MEC applications of the service provider on behalf of the user device.

In an embodiment, the communication network is a Wi-Fi network. In an embodiment, the profile is a hot spot 2.0 profile. In an embodiment, the profile comprises a unique identity and credentials of a user associated with the user device. In an embodiment, the communication management platform choses to share one of a splash page and a captive portal with information related to one of the service providers and corresponding partner network hosted MEC applications. In an embodiment, the conditions for the granting access include: a first time the user device connects to the communication network of the premises, a guest user device that connects to the communication network at a specific zone of the premises, and a specific time of the day when the connection is established.

In an embodiment, in response to the authenticating of the user device, the communication management platform extracts information regarding a list of running MEC user applications and present that information to the user device via one of the splash page and the captive portal. In an embodiment, in response to the authenticating of the user device with the MEC system, the MEC system patches a data plane between the user device and the MEC application for a local breakout. In an embodiment, the MEC system enables access to the data plane by default without any explicit client application that the user needs to download. In an embodiment, when the user device is aware of the presence of the MEC applications, the user device accesses the MEC applications using one or more standard DNS-based-operations. In an embodiment, the user device sends a DNS request to resolve URL of the service provider, and wherein a DNS server replies with an IP address of the local MEC application. In an embodiment, the communication management platform is hosted on a cloud.

In other words, the system disclosed here refers to an architecture to inform the Wi-Fi users about the presence of MEC user applications or services at a premise without downloading a client application. Hotspot2.0 technology is used to automatically authorize the user over MEC Mx-2 interface to gain control and manage lifecycle of MEC user applications. As against the standard methods where a client/user side mobile application is required, the solution disclosed using the system based on existing push-based methods such as, captive portal, splash page, SMS, WhatsApp etc. to present the same information to the user but without creating a friction of downloading the mobile application.

These and other objects, embodiments and advantages of the present invention will become readily apparent to those skilled in the art from the following detailed description of the embodiments having reference to the attached figures, the invention not being limited to any particular embodiments disclosed.

BRIEF DESCRIPTION OF FIGURES

The foregoing and further objects, features and advantages of the present subject matter will become apparent from the following description of exemplary embodiments with reference to the accompanying drawings, wherein like numerals are used to represent like elements.

It is to be noted, however, that the appended drawings along with the reference numerals illustrate only typical embodiments of the present subject matter, and are therefore, not to be considered for limiting of its scope, for the subject matter may admit to other equally effective embodiments.

DETAILED DESCRIPTION

Figure 1:
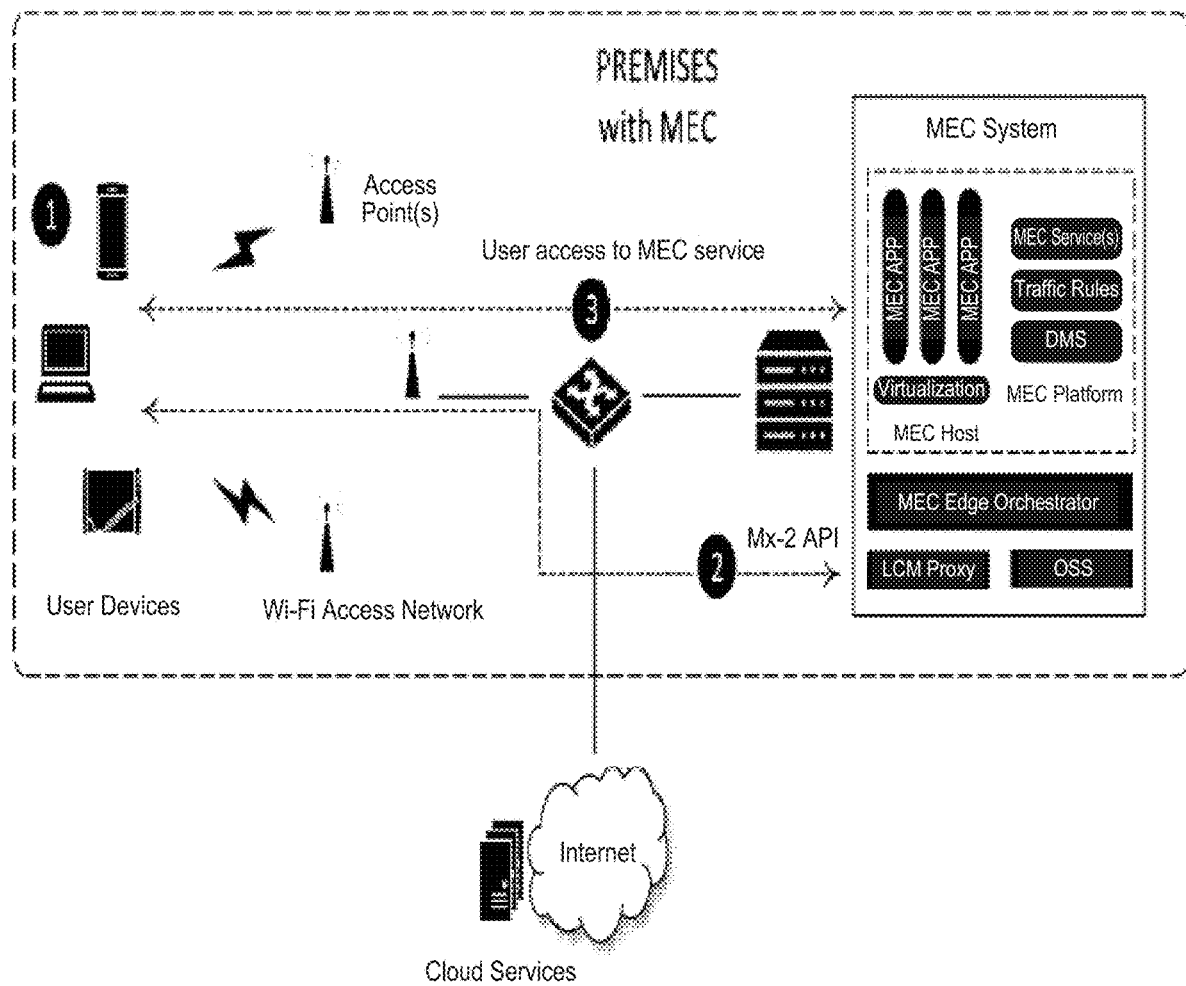
FIG. 1 illustrates a prior art MEC system deployed within a premise and using Wi-Fi as an access network.

Exemplary embodiments now will be described with reference to the accompanying drawings. The disclosure may, however, be embodied in many different forms and should not be construed as limited to the embodiments set forth herein; rather, these embodiments are provided so that this disclosure will be thorough and complete, and will fully convey its scope to those skilled in the art. The terminology used in the detailed description of the particular exemplary embodiments illustrated in the accompanying drawings is not intended to be limiting. In the drawings, like numbers refer to like elements.

It is to be noted, however, that the reference numerals used herein illustrate only typical embodiments of the present subject matter, and are therefore, not to be considered for limiting of its scope, for the subject matter may admit to other equally effective embodiments.

The specification may refer to "an", "one" or "some" embodiment(s) in several locations. This does not necessarily imply that each such reference is to the same embodiment (s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include operatively connected or coupled. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The figures depict a simplified structure only showing some elements and functional entities, all being logical units whose implementation may differ from what is shown. The connections shown are logical connections; the actual physical connections may be different. It is apparent to a person skilled in the art that the structure may also comprise other functions and structures.

Also, all logical units described and depicted in the figures include the software and/or hardware components required for the unit to function. Further, each unit may comprise within itself one or more components which are implicitly understood. These components may be operatively coupled to each other and be configured to communicate with each other to perform the function of the said unit.

Figure 2:
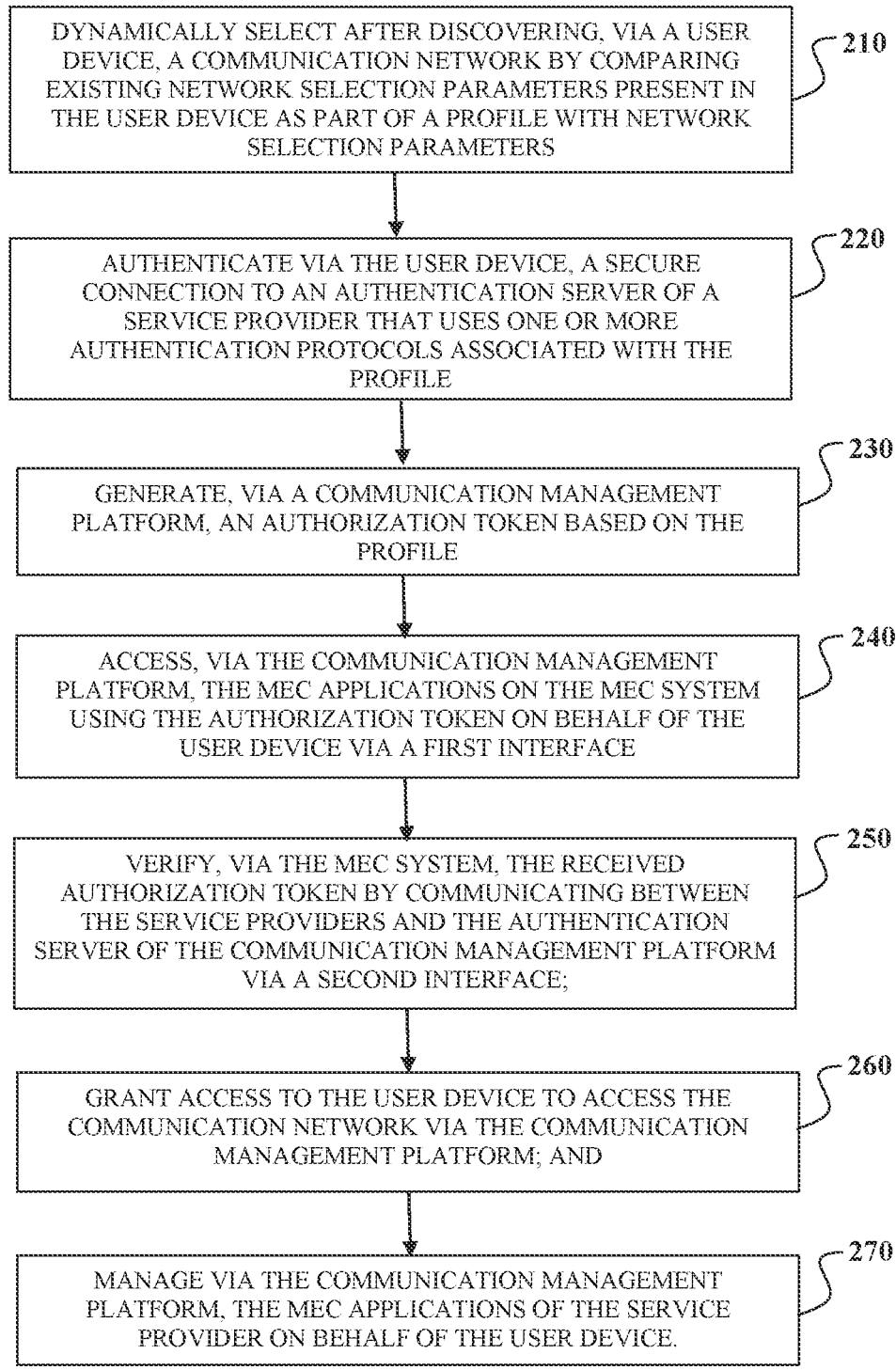
FIG. 2 illustrates a method flow diagram that indicates a system and method for dynamic discovery of Multi-Access Edge Computing (MEC) applications on an MEC system.
Figure 3:
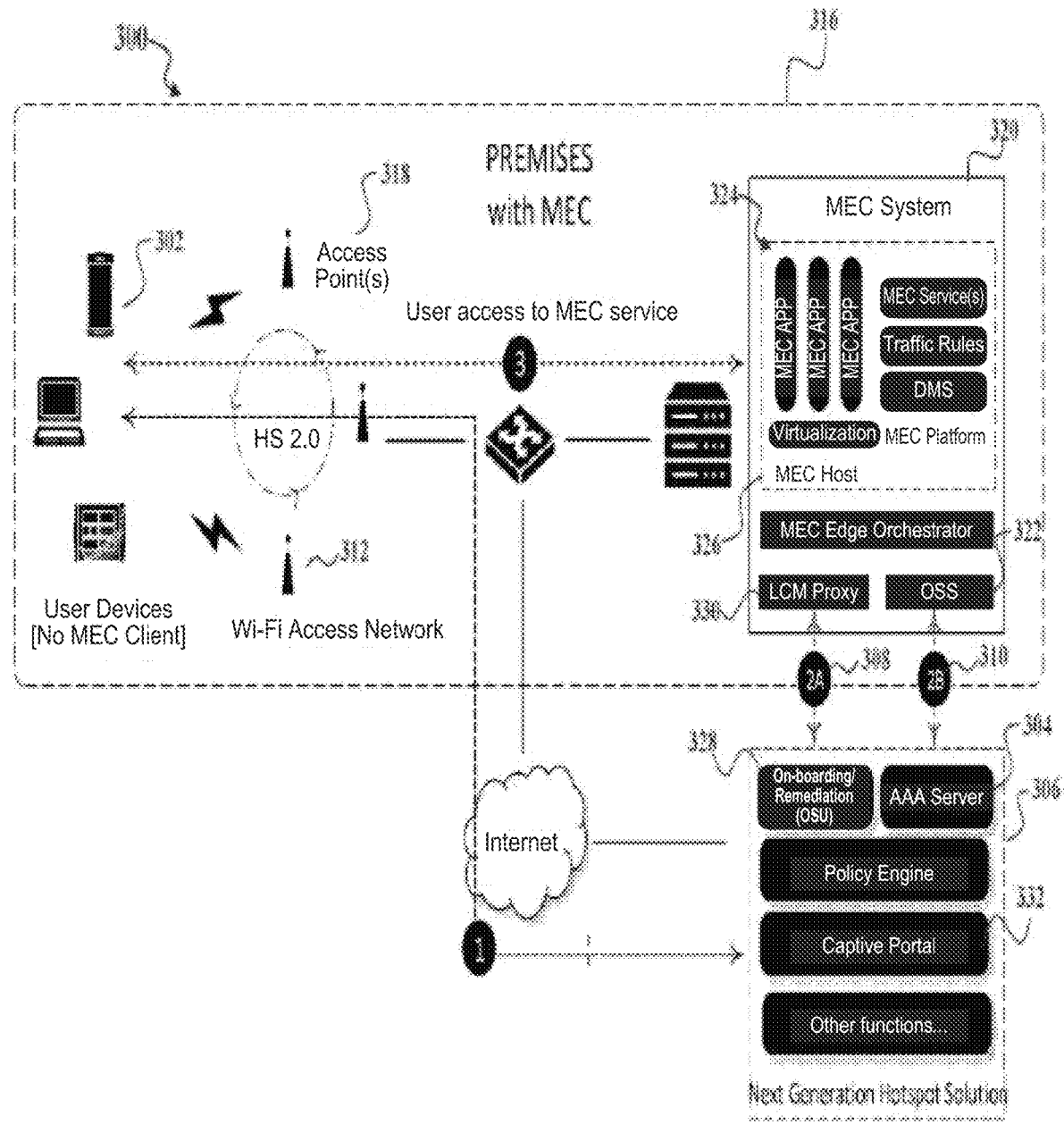
FIG. 3 shows a modified architecture of FIG. 1, that describes the system and method explained in-line with FIG. 2, with the relevant entities along with their high-level interaction.

FIG. 2 illustrates a method flow diagram that indicates a system and method for dynamic discovery of Multi-Access Edge Computing (MEC) applications on an MEC system 320, that is further described in FIG. 3. The system 300 comprises a user device 302, a communication management platform 306 that includes an authentication server 304, a first interface 308, and a second interface 310. The user device dynamically selects, after discovering, a communication network 312 by comparing existing network selection parameters present in the user device 302 as part of a profile with network selection parameters that are received from a communication network infrastructure when the user device 302 with a profile enters the MEC enabled premises 316. The communication network 312 is, for example, a Wi-Fi network. The profile is, for example, an HS2.0 profile. In other words, the step involves dynamically discovering and selecting, via a user device 302, a Wi-Fi network 312 by comparing network selection parameters present in the user device 302 with the ones configured in the Wi-Fi network 312, for example, access point 318 or WLC, when the user device with a Hot stop 2.0 (HS2.0) profile enters the MEC enabled premises 316.

The authentication server 304 of a service provider authenticates a secure connection with the user device 302, wherein the authentication server 304 uses one or more authentication protocols associated with the profile. The one or more authentication protocols are, for example, EAP based methods as specified by hot spot 2.0 spec. In other words, once the selection is completed, the HS2.0 Wi-Fi network 312 automatically initiates an 802.1X based authentication between the user device 302 and the AAA server 304 of Wi-Fi management platform 306 (NGH). User device 302 uses the authentication protocol and credentials associated with its HS2.0 profile for such authentication. The communication management platform 306 then generates an authorization token based on the profile, and accesses the MEC applications on the MEC system 320 using the authorization token on behalf of the user device 302 via a first interface 308. The first interface 308 is, for example, a Mx-2 interface.

The second interface 310 verifies, via the MEC system 320, the received authorization token by communicating between the service providers, for example, OSS service providers 322, and the authentication server 304 of the communication management platform 306. The second interface 310 is for example, an Authentication-Authorization (AA) interface. The authentication server 304 is, for example, a AAA authentication server. The communication management platform 306 then grants access to the user device 302 to access the communication network 312 and manages the MEC applications 324 of the service provider on behalf of the user device 302. In other words, a summarized version of this step explains that once the user device 302 is successfully authenticated on the Wi-Fi network 312, the Wi-Fi management platform 306 uses the same credentials to generate an OAuth 2.0 based authorization token. The Wi-Fi management platform 306 then sends a message requesting the list of MEC applications 324 to the MEC sub-system 326, over Mx-2 interface 308, using the generated authorization token. The MEC sub-system 326 then validates the received token by communicating with authorization server 304 of the service providers, which is Wi-Fi Management Platform 306 or NGH AAA in this case. Once this authorization is successful, MEC sub-system 326 replies with the list of MEC applications 324 to the Wi-Fi Management Platform 306 over the Mx-2 interface 308. Once the Wi-Fi Management Platform 306 has the list of MEC applications 324, it shall present the user with this list using various mechanisms like captive portal 332, SMS, WhatsApp etc.

In an embodiment, the profile comprises a unique identity and credentials of a user associated with the user device 302. In an embodiment, the communication management platform 306 choses to share one of a splash page and a captive portal 332 with information related to one of the service providers and corresponding partner network hosted MEC applications 324. In an embodiment, the conditions for the granting access include: a first time the user device 302 connects to the communication network 312 of the MEC enabled premises 316, a guest user device that connects to the communication network 312 at a specific zone of the premises, and a specific time of the day when the connection is established.

In an embodiment, in response to the authenticating of the user device 302, the communication management platform 306 extracts information regarding a list of running MEC user applications 324 and present that information to the user device 306 via one of the splash page and the captive portal 332. In an embodiment, in response to the authenticating of the user device 302 with the MEC system 320, the MEC system 320 patches a data plane between the user device 302 and the MEC application 324 for a local breakout. In an embodiment, the MEC system 320 enables access to the data plane by default without any explicit client application that the user needs to download. In an embodiment, when the user device 302 is aware of the presence of the MEC applications 324, the user device 302 accesses the MEC applications 324 using one or more standard DNS-based-operations. In an embodiment, the user device 302 sends a DNS request to resolve URL of the service provider, and wherein a DNS server replies with an IP address of the local MEC application 324. In an embodiment, the communication management platform 306 is hosted on a cloud.

The solution disclosed through the system involves Hotspot2.0 based technology to not only connect the user device 302 seamlessly to the Wi-Fi network 312 but also to automatically discover the user applications 324 hosted on the MEC system 320 without requiring a client application. The Hotspot 2.0 Technology (HS2.0), also referred to as Passpoint, is a Wi-Fi Alliance (WFA) specification to enable cellular like automatic discovery, connection, security and roaming experience for the Wi-Fi networks 312. Similar to the example of having a SIM card for the cellular networks, HS2.0 enabled network requires a one-time profile to be installed in the user device 302. User can download and install this profile in advance i.e., before coming to the premises 316 where MEC is installed. The profile forms the unique identity of the user and enables automatic discovery, selection and secure connection to the Wi-Fi network 312. It makes the user device 302 agnostic to the name of Wi-Fi SSID and thus provides seamless roaming across partner Wi-Fi networks.

FIG. 3 shows a modified architecture of FIG. 1, that describes the system and method explained in-line with FIG. 2, with the relevant entities along with their high-level interaction. Diagram shows an MEC system 320 hosted within the premises 316; but in practice it can be hosted anywhere close to the premises. Wi-Fi is being used as the access network and the infrastructure (access points/wireless Lan controller) is HS2.0 compliant. Wi-Fi management platform 306, shown as 'Next Generation Hotspot' solution is responsible for onboarding the users to the Wi-Fi network 312. The Wi-Fi management platform 306 is hosted with-in the premises 316; but for enabling seamless roaming across sites, it is usually hosted on the cloud as shown in the FIG. 3. In the system 300 disclosed here, the solution described is that the Wi-Fi onboarding system 328 interacts with the MEC system 320 over two interfaces 308 and 310. On one side, the Wi-Fi onboarding system 328 interacts with the User Application Lifecycle Management (UALCM) proxy module 330 of the MEC system 320 over 'mx-2' interface 308, shown as '2A' in FIG. 3. On other side, the Wi-Fi onboarding system 328 interacts with the MEC module 322 responsible for authorizing the 'mx-2' interface requests. Such logical function can be a part of UALCM proxy 330 itself or the OSS (Operation Support System) 322 or other MEC modules.

The following are the sequence of steps involved in our clientless discovery of MEC user applications 324:
  a) Network discovery and Selection (ND&S): When a user device 302 with a valid HS2.0 profile enters the MEC enabled premises 316, it shall automatically discover and select a suitable Wi-Fi network 312 by comparing the network selection parameters configured in the user device 302 with the ones configured in the Wi-Fi network 312.
  b) Secure connection: Once selected, the user device 302 shall establish a secure Wi-Fi connection with service providers backend AAA server 304 using one of EAP based methods suggested by HS2.0 specification (EAP-SIM/AKA/TLS/TTLS). The HS2.0 profile contains device unique identity as well as credentials.
  c) Access Control: Once the user is successfully authenticated and authorized, Wi-Fi access management platform 306 grants network access to the user. Based on certain conditions the Wi-Fi management platform 306 chooses to present a splash page/captive portal 332 with information related to service providers or their partner network hosted MEC applications 324. Such conditions may comprise: the first time a user connects to Wi-Fi network 312 of the premises 316, a guest user connects to Wi-Fi network 312 at a specific zone (for example, cafeteria) of the premises 316, connection at specific time of the day, etc.
  d) MEC user application lifecycle management: The Wi-Fi management platform 306 is aware of the users' identity and their Wi-Fi network access credentials. The system 300 therefore uses this information to generate an authorization token (OAuth2.0) and uses it to gain access to MEC on behalf of the user over Mx-2 interface 308 ('2A' interface in the FIG. 1). The MEC system 320 verifies the received authorization token by communicating with service providers AA (Authentication, Authorization) server 310 ('2B' interface in FIG. 1). Once the user is authorized, the Wi-Fi management platform 306 shall be able to manage service providers MEC applications 324 on behalf of the user. The Wi-Fi management platform 306 then fetches the list of running MEC user applications 324 and present that information to the user via splash page or captive portal 332. In another embodiment, the Wi-Fi management platform 306 uses other push mechanisms such as SMS, WhatsApp etc. to send this information to the user.

Step number #1 shown in FIG. 3 corresponds to steps (a), (b) and (c) mentioned above along with the display of the list of MEC application 324 via captive portal 332 mentioned in step (d). Once the client has been successfully authorized with the MEC system 320, the latter patches the data plane between the client and the MEC application 324 for local breakout. In an embodiment, the MEC system 320 enables such data plane access by default, or in other words, without client authorization. Therefore, once the client is aware of the presence of such MEC applications 324 (using the technique mentioned in this writeup), it can access the MEC applications 324 using standard DNS-based-discovery approach. Or in other words, the client sends a DNS request to resolve URL of the service and the DNS server replies with IP address of the local MEC application rather than that of its cloud instance. This process has been shown as step #3 in FIG. 3. Therefore, the system does not require any mobile application on the user device 302 to notify the user of the presence of MEC applications/services 324.

Backward Compliance

For legacy devices which are not HS2.0 compliant, the above sequence of steps holds true except the following differences:
  a) These devices are not HS2.0 compliant, so Wi-Fi management platform 306 shall provide them Wi-Fi access via an Open SSID. User will manually click on the SSID to get connected.
  b) The Wi-Fi management platform 306 shall authenticate and authorize these devices using MAC-Auth approach. In case the MAC address is randomized for a device, Wi-Fi management platform 306 shall present a login page where the user is required to authenticate via service provider credentials.
  c) Rest of the steps shall remain the same.

As will be appreciated by one of skill in the art, the present invention may be embodied as a method, system and apparatus. Accordingly, the present invention may take the form of an entirely hardware embodiment, a software embodiment or an embodiment combining software and hardware aspects.

It will be understood that each block of the block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In the drawings and specification, there have been disclosed exemplary embodiments of the invention. Although specific terms are employed, they are used in a generic and descriptive sense only and not for purposes of limitation of the scope of the invention.

We claim:

1. A method for dynamic discovery of Multi-Access Edge Computing (MEC) applications on an MEC system, the method comprising:
  dynamically selecting after discovering, via a user device, a communication network by comparing existing network selection parameters present in the user device as part of a profile with network selection parameters that are received from a communication network infrastructure when the user device with a profile enters MEC enabled premises;

in response to the selecting, authenticating via the user device, a secure connection to an authentication server of a service provider that uses one or more authentication protocols associated with the profile;

generating, via a communication management platform, an authorization token based on the profile;

accessing, via the communication management platform, the MEC applications on the MEC system using the authorization token on behalf of the user device via a first interface;

verifying, via the MEC system, the received authorization token by communicating between the service providers and the authentication server of the communication management platform via a second interface;

in response to the authenticating, granting access to the user device to access the communication network via the communication management platform; and managing via the communication management platform, the MEC applications of the service provider on behalf of the user device.

2. The method as claimed in claim 1, wherein the communication network is a Wi-Fi network.

3. The method as claimed in claim 1, wherein the profile is a hot spot 2.0 profile.

4. The method as claimed in claim 3, wherein the profile comprises a unique identity and credentials of a user associated with the user device.

5. The method as claimed in claim 3, wherein the conditions for the granting access include:
- a first time the user device connects to the communication network of the MEC enabled premises,
- a guest user device that connects to the communication network at a specific zone of the premises, and
- a specific time of the day when the connection is established.

6. The method as claimed in claim 1, wherein the communication management platform choses to share one of a splash page and a captive portal with information related to one of the service providers and corresponding partner network hosted MEC applications.

7. The method as claimed in claim 1, wherein, in response to the authenticating of the user device, the communication management platform extracts information regarding a list of running MEC user applications and present that information to the user device via one of the splash page and the captive portal.

8. The method as claimed in claim 1, in response to the authenticating of the user device with the MEC system, the MEC system patches a data plane between the user device and the MEC application for a local breakout.

9. The method as claimed in claim 8, the MEC system enables access to the data plane by default without any explicit client application that the user needs to download.

10. The method as claimed in claim 1, wherein when the user device is aware of the presence of the MEC applications, the user device accesses the MEC applications using one or more standard DNS-based-operations.

11. The method as claimed in claim 1, wherein the user device sends a DNS request to resolve URL of the service provider, and wherein a DNS server replies with an IP address of a local MEC application.

12. The method as claimed in claim 1, wherein the communication management platform is hosted on a cloud.

13. A system for dynamic discovery of Multi-Access Edge Computing (MEC) applications on an MEC system, the system comprising:

a user device that dynamically selects, after discovering, a communication network by comparing existing network selection parameters present in a user device as part of a profile with network selection parameters that are received from a communication network infrastructure when the user device with a profile enters MEC enabled premises;

an authentication server of a service provider that authenticates a secure connection with the user device, wherein the authentication server uses one or more authentication protocols associated with the profile;

a communication management platform that generates an authorization token based on the profile, and accesses the MEC applications on the MEC system using the authorization token on behalf of the user device via a first interface;

a second interface that verifies, via the MEC system, the received authorization token by communicating between the service providers and the authentication server of the communication management platform; and the communication management platform grants access to the user device to access the communication network and manages the MEC applications of the service provider on behalf of the user device.

14. The system as claimed in claim 13, wherein the communication management platform choses to share one of a splash page and a captive portal with information related to one of the service providers and corresponding partner network hosted MEC applications.

15. The system as claimed in claim 13, wherein the conditions for the grant of access include:
- a first time the user device that connects to the communication network of the MEC enabled premises,
- a guest user device that connects to the communication network at a specific zone of the MEC enabled premises, and
- a specific time of the day when the connection is established.

16. The system as claimed in claim 13, wherein in response to the authentication of the user device with the MEC system, the MEC system patches a data plane between the user device and the MEC application for a local breakout.

17. The system as claimed in claim 16, wherein the MEC system enables access to the data plane by default without an explicit client application that the user needs to download.

18. A non-transitory computer program product to dynamically discover Multi-Access Edge Computing (MEC) applications on an MEC system, when executed by a computer, the computer program product comprising programmed codes to:

dynamically select after discovery, via a user device, a communication network by comparing existing network selection parameters present in the user device as part of a profile with network selection parameters that are received from a communication network infrastructure when the user device with a profile enters MEC enabled premises;

in response to the selection, authenticate via the user device, a secure connection to an authentication server of a service provider that uses one or more authentication protocols associated with the profile;

generate, via a communication management platform, an authorization token based on the profile;

access, via the communication management platform, the MEC applications on the MEC system using the authorization token on behalf of the user device via a first interface;

verify, via the MEC system, the received authorization token by communicating between the service providers and the authentication server of the communication management platform via a second interface;

in response to the authentication, grant access to the user device to access the communication network via the communication management platform; and manage, via the communication management platform, the MEC applications of the service provider on behalf of the user device.

* * * * *